United States Patent
Yang et al.

(10) Patent No.: US 12,093,631 B2
(45) Date of Patent: Sep. 17, 2024

(54) METHOD, SYSTEM AND VERIFYING PLATFORM FOR SYSTEM ON CHIP VERIFICATION

(71) Applicant: Black Sesame Technologies Inc., San Jose, CA (US)

(72) Inventors: Junwei Yang, Shenzhen (CN); Wei Cai, Shenzhen (CN); Maosheng Xue, Shenzhen (CN)

(73) Assignee: Black Sesame Technologies Inc.

( * ) Notice: Subject to any disclaimer, the term of this patent is extended or adjusted under 35 U.S.C. 154(b) by 274 days.

(21) Appl. No.: 17/500,768

(22) Filed: Oct. 13, 2021

(65) Prior Publication Data
US 2022/0292248 A1  Sep. 15, 2022

(30) Foreign Application Priority Data

Mar. 11, 2021 (CN) .......................... 202110266859.7

(51) Int. Cl.
*G06F 30/398* (2020.01)
*G06F 111/20* (2020.01)
*G06F 115/02* (2020.01)

(52) U.S. Cl.
CPC ........ *G06F 30/398* (2020.01); *G06F 2111/20* (2020.01); *G06F 2115/02* (2020.01)

(58) Field of Classification Search
CPC .................................................. G06F 30/398
USPC ........................................................ 716/138
See application file for complete search history.

(56) References Cited

U.S. PATENT DOCUMENTS 6,539,522 B1 * 3/2003 Devins ........... G01R 31/318357
716/136
2017/0115969 A1  4/2017 Pendharkar et al.

FOREIGN PATENT DOCUMENTS

CN  106940428 A  7/2017

OTHER PUBLICATIONS

Yi-duan Su, Zhi-guo Yu, Xiao-feng Gu, A SoC Verification Platform based on Reusable Stimulus Generation Mechanism, Computer Engineering & Science, vol. 38, No. 7, Jul. 2016.

* cited by examiner

*Primary Examiner* — Eric D Lee
(74) *Attorney, Agent, or Firm* — Timothy T. Wang; Ni, Wang & Massand, PLLC

(57) ABSTRACT

A method for system-on-chip (SoC) verification is disclosed. The method includes: establishing a component library including at least an interface protocol component, a bus protocol component and a verification component for the SoC; creating a control file according to a verification requirement; establishing a software library for each processor of the SoC to run according to the verification requirement, and establishing an excitation library for corresponding components in the component library; establishing a script library including multiple script files based on the verification requirement and the control file; parsing, by the script, the control file of the verification platform to obtain control parameters of the verification platform when a verification scenario is determined; selecting a required component from the component library and selecting a required excitation from the excitation library to generate the verification platform according to the control parameters; and verifying the SoC by the verification platform.

8 Claims, 9 Drawing Sheets

METHOD, SYSTEM AND VERIFYING PLATFORM FOR SYSTEM ON CHIP VERIFICATION

CROSS-REFERENCE TO RELATED APPLICATIONS

The application claims priority to Chinese patent application No. 202110266859.7, filed on Mar. 11, 2021, the entire contents of which are incorporated herein by reference.

TECHNICAL FIELD

The present disclosure relates to verification of chips, and more specifically, to technologies for System on Chip (SoC) verification.

BACKGROUND

SoC is the integration of a complete system on a single chip. Because of the exponential growth of SoC design scale and structure complexity, the system-level verification of SoC is facing more and more challenges in verification completeness and verification efficiency.

The conventional verification method is based on System Verilog (SV), which is an abstract high-level language of object-oriented programming. The verification platform and verification cases are constructed on the basis of Universal Verification Methodology (UVM), and the verification is simulated in Electronic Design Automation (EDA) tools. In this way, it is usually necessary to build a complete and complex verification environment to perform functional simulation of the SoC. In such a conventional verification structure, even if the function of only one processor is verified, all the components in the verification structure are required to participate in it, namely, all the processors and co-processors in the verification structure need to be simulated. This results in a high consumption of verification resource and a relatively long consumption of time.

SUMMARY

In view of the above, the present disclosure provides an improved method for the SoC verification. The method includes: establishing a component library including at least an interface protocol component, a bus protocol component, and a verification component for the SoC, creating a control file for controlling a verification platform for verifying the SoC according to a verification requirement; the control file includes control parameters; establishing a software library for each processor of the SoC to run according to the verification requirement of the SoC, and establishing an excitation library for corresponding components in the component library; the software library includes at least an execution software of each processor, and the excitation library includes at least a generator for issuing an excitation of each universal interface protocol; establishing a script library including a number of script files based on the verification requirement and the control file; the script library includes a verification platform control file parsing script; parsing, by the script, the control file of the verification platform to obtain control parameters of the verification platform when a verification scenario is determined; selecting a required component from the component library and selecting a required excitation from the excitation library to generate the verification platform according to the control parameters; and verifying the SoC by the verification platform.

According to some examples of the present disclosure, the script library in the method for an SoC verification further includes a verification environment generation script, a call register model generation script, a simulation script, a regression script and a register generation script.

According to some examples of the present disclosure, the step of selecting a required component from the component library and selecting a required excitation from the excitation library to generate the verification platform according to the control parameters further includes: obtaining, by the simulation script, a configuration of buses and interfaces of the verification platform; generating a corresponding configuration file of a bus interface model according to the parameters of each interface mounted on the system bus in the SoC; configuring a specific processor or interface as a corresponding processor or interface according to the configuration file of the bus interface mode for simulation when the specific processor or interface of the processors of the SoC is simulated; and replacing remaining processors or remaining interfaces with bus models to avoid a participation of the remaining processors or the remaining interfaces in the simulation.

According to some examples of the present disclosure, the step of selecting a required component from the component library and selecting a required excitation from the excitation library to generate the verification platform according to the control parameters further includes: obtaining, by the verification environment generation script, configuration parameters of the verification platform, selecting required verification components and interface components from the component library, and generating a basic framework of the verification platform; reading, by the call register model generation script, a register file in a configuration file of the platform to generate the register model code and corresponding adaptive components; generating a top layer of the verification environment according to the connection relationship of the components in the configuration of the verification platform; and generating a configuration file of the verification environment according to the parameters of the verification platform, so as to control all the configuration parameters of the verification environment.

According to another aspect of the present disclosure, a verification system for a SoC verification is also provided. The system includes a first generation unit configured to establish a component library including at least an interface protocol component, a bus protocol component, and a verification component for the SoC; a second generation unit, configured to create a control file for controlling a verification platform for verifying the SoC according to a verification requirement; the control file includes control parameters; a third generation unit, configured to establish a software library for each processor of the SoC to run according to the verification requirement of the SoC, and establish an excitation library for corresponding components in the component library; the software library includes at least an execution software of each processor, and the excitation library includes at least a generator for issuing an excitation of each universal interface protocol; a fourth unit, configured to establish a script library including a number of script files based on the verification requirement and the control file; the script library includes a verification platform control file parsing script; a fifth unit, configured to parse, by the script, the control file of the verification platform to obtain control parameters of the verification platform when a verification scenario is determined; and a sixth unit, configured to select a required component from the component library and select a required excitation from the excitation library to generate the verification platform according to the control parameters.

The present disclosure also provides a controller including processors and memories. Instructions are stored in the memories, and any one of the methods for a SoC verification described herein are implemented when the instructions are executed by the processors.

A verification platform for the SoC verification is also provided. The verification platform is configured as an internal architecture according to the SoC to be verified, and when a specific processor or interface of processors of the SoC is to be simulated, the specific processor or interface is configured as a corresponding processor or interface for simulation, while the remaining processors or the remaining interfaces are replaced with bus models to avoid a participation in the simulation.

DETAILED DESCRIPTION OF THE EMBODIMENTS

In order to make the above objects, features and advantages of the present disclosure easier to understood, specific embodiments of the present disclosure will be described in detail with reference to the accompanying drawings. Although numerous specific details are set forth in the following description, it is intended that the present disclosure be fully understood and not to limit the protection scope of the present disclosure.

An SoC typically includes one or more processors (CPUs), various internal and external memories, various hardware acceleration co-processors for specific service applications, general high-speed and low-speed interfaces for communicating and exchanging data with other chips or peripherals, and a bus interconnection module connecting these functional units.

Figure 1:
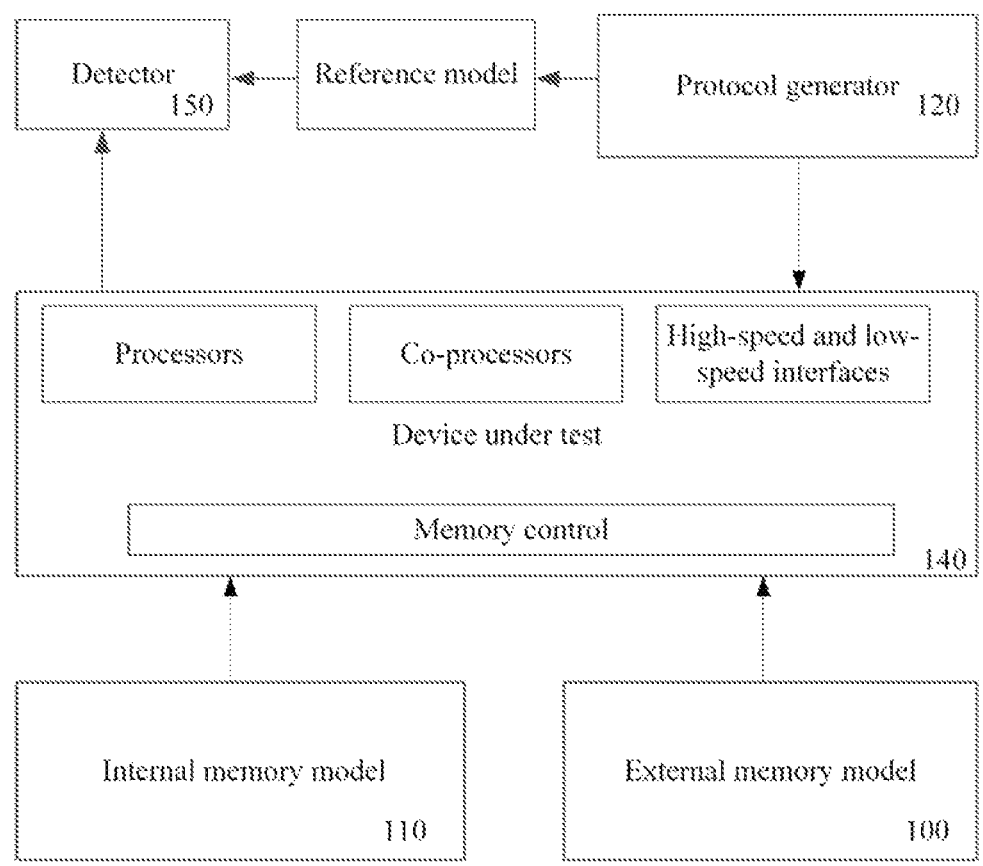
FIG. 1 illustrates the structure of a conventional SoC system-level verification platform based on the UVM methodology.

FIG. 1 illustrates the structure of a conventional SoC system-level verification platform based on the UVM methodology. For an SoC including n processors, n co-processors, multiple high-speed and low-speed input interfaces, memories and a bus for interconnecting these devices, for example, when it is verified by the verification platform as shown in FIG. 1, it is necessary to build a model for it. As shown in FIG. 1, the verification platform includes an internal memory model 110, an external memory model 100, a bus protocol generator 120, an device under test 140, and a detector 150. The internal memory model 110 and the external memory model 100 are respectively models of the internal memory and the external memory of the SoC under test, namely, the device under test 140. The device under test 140 includes models of each processor, each co-processor and each high-speed and low-speed input interface in the SoC. During the verification, the software executed by each processor, each co-processor, and the like is compiled into an executable file and imported into the external memory model 100. The internal memory model 110 is, for example, a DRAM. The external memory model 100 is, for example, a Flash memory. The device under test 140, that is, the SoC under test includes one or more processors, one or more co-processors and high-speed and low-speed interfaces. The high-speed and low-speed interfaces may be bus interfaces such as PCIe, USB, SATA, Ethernet, SD, SPI, I2C, UART, CAN, etc. The bus protocol generator 120 is connected to high-speed and low-speed interfaces, the device under test 140 is connected to the inner memory model 110 and the external memory model 100, respectively, and the device under test 140 is connected to the detector 150. For example, one or more processor software may be stored in the external memory model 100.

Figure 2:
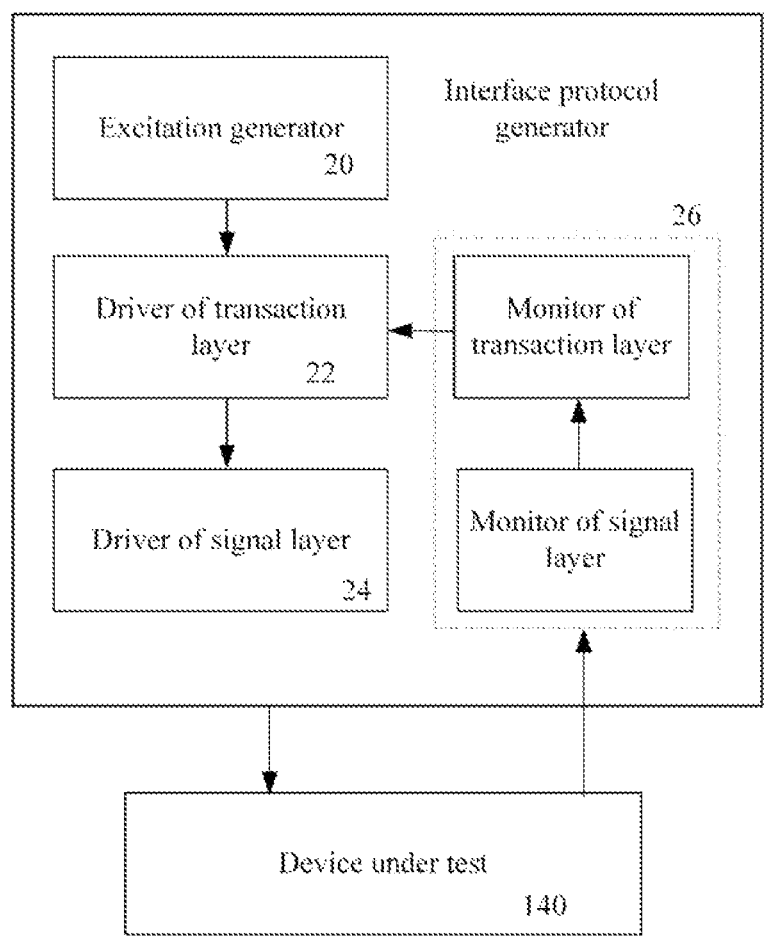
FIG. 2 is the basic structure of the interface protocol generator based on the UVM methodology.

FIG. 2 shows the basic structure of the interface protocol generator based on the UVM methodology. The interface protocol generator is issued by a excitation generator 20. The excitation is transmitted to a driver of the transaction layer 22, and a driver of the signal layer 24 transmits the excitation to the device under test 140. The bus monitor 26 collects and processes the excitation of the input and output signals of the device under test 140 on the bus.

Figure 3:
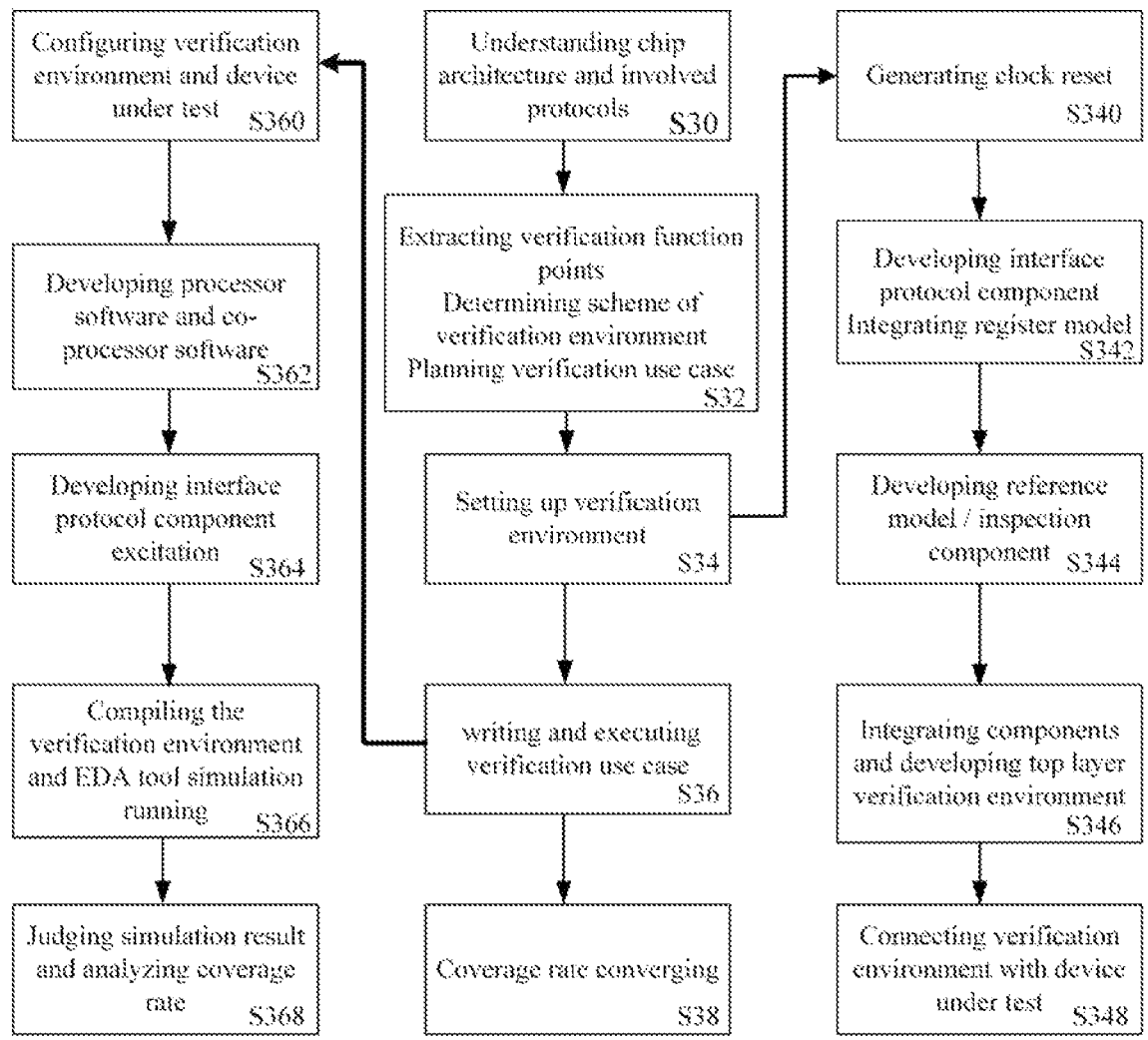
FIG. 3 is a schematic diagram of a conventional SoC system verification mainstream environment building process and a use case testing process.

FIG. 3 is a schematic diagram of a conventional SoC system verification mainstream environment building process and a use case test process. As shown in the figure, before setting up the verification environment (S34), it is necessary to understand the chip architecture and the involved protocols (S30). After S30, the verification function points are extracted, the scheme of the verification environment is determined, and the verification use case is planned, which are shown in step S32. As understood by those skilled in the art, the verification function points refer to functional units to be verified. The functional units may be divided downward or generalized upward according to the verification requirement, for example, a functional unit to be verified is an A function, which in turn is implemented by multiple sub-functions together, the A function to be verified can be further divided down into multiple sub-functional units, that is, multiple sub-functional units are further refined. In some cases, the A function and the B function are combined to complete a larger C function, in which case, the A function and the B function can also be summarized upward as a C function point, that is, the C function generated by the combination of A and B is verified. The term of verification use case is also consistent with the understanding of those skilled in the art in this disclosure, and refers to the process constructed by, for example, a program language to verify a verification function point. For example, the verification function point A is an input/output function point, and the input/output engineering for simulating the SoC through a certain programming language is a verification use case.

Still referring to FIG. 3, after the verification environment is built, on the one hand, writing and execution phase of the verification use case is entered, as shown in step S36, and on the other hand, a clock reset may be set for use in the verification process, as shown in step S340.

After step S36, on the one hand, the verification environment and the device under test can be determined, as shown in step S360, and on the other hand, the coverage rate in the later stage of the verification converges, as shown in step S38.

Starting from step S340, the following items are sequentially performed: developing an interface protocol component and integrating a register model (S342), developing a reference model and an inspection component (S344), integrating the components and developing the top layer verification environment (S346), and connecting the verification environment with the device under test, that is, the SoC under test (S348).

From step S360, the following items are sequentially performed: developing the processor software and co-processor software (S362), developing the interface protocol component excitation (S364), compiling the verification environment, and EDA tool simulation running (S366), and judging the simulation result and analyzing the coverage rate (S368).

In the above process combined with FIG. 3, it is necessary to write the execution software of each CPU core and co-processor in the verification use case before compilation. During compilation, RTL (Register Transfer Level) code or netlist file of each processor core, co-processor and interface components is required, and test use case need to construct simulation excitation for different interface protocols. About such a system-level verification method:

1. the test use case needs to include all the RTL or netlists of all the processors, co-processors and each of the interface protocol, which will consume huge computing resources and time of the server in the phase of test use case compilation and simulation, with huge consumption of efficiency and cost;

2. in the test use case, the software to be executed by each processor core needs to be written and the joint simulation of software and hardware needs to be performed, while the software programming and execution phases need to consume a lot of time and computing resources; and 3. it is necessary to control the excitation of different high-speed and low-speed interface protocols in the test use case, and to verify that the engineer grasps all the interface protocols and the excitation generation mechanism, so the technical requirements for engineers are very high.

It can be seen that using the SoC system-level verification scheme based on UVM to verify SoCs has low time efficiency, large consumption of computing resources, and relatively high technical requirements for verification engineers.

Figure 4:
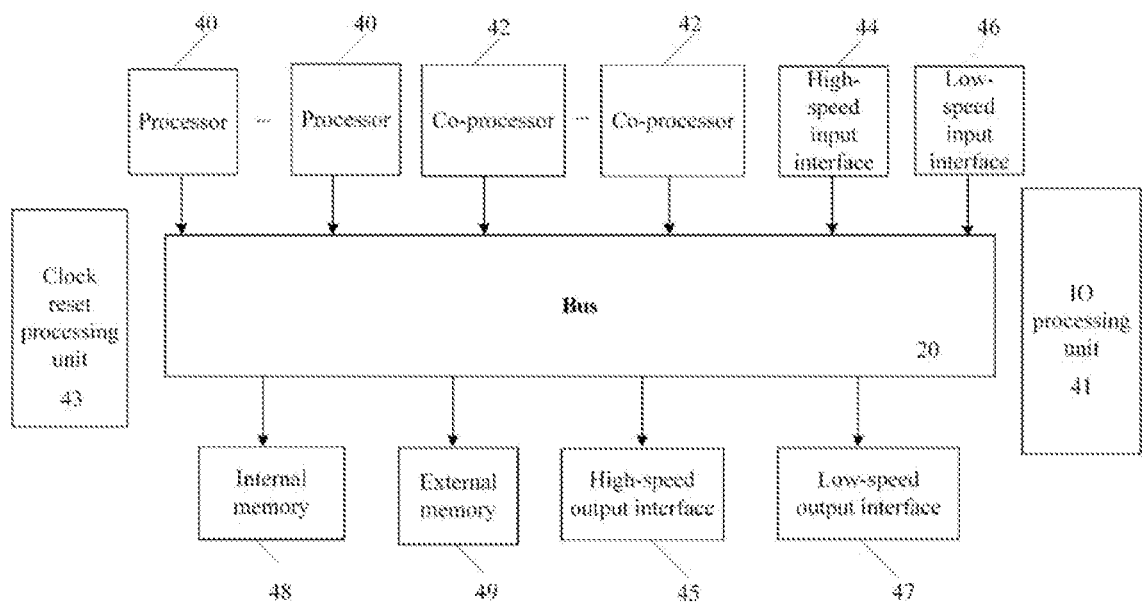
FIG. 4 is a structure diagram of an exemplary SoC.

FIG. 4 illustrates an exemplary SoC structure. The illustrated SoC includes multiple processors 40, multiple co-processors 42, a high-speed input interface 44, a low-speed input interface 46, a high-speed output interface 45, a low-speed output interface 47, an internal memory 48, an external memory 49, an IO processing unit 41 and a clock reset processing unit 43. The processors, co-processors, high-speed output interface, low-speed input interface, high-speed output interface, low-speed output interface, external memory, internal memory and the like of the SoC are all communicated through a bus.

In brief, the method for SoC system-level verification according to the example of the present disclosure mainly includes two processes of verification environment building and simulation verification.

Figure 5:
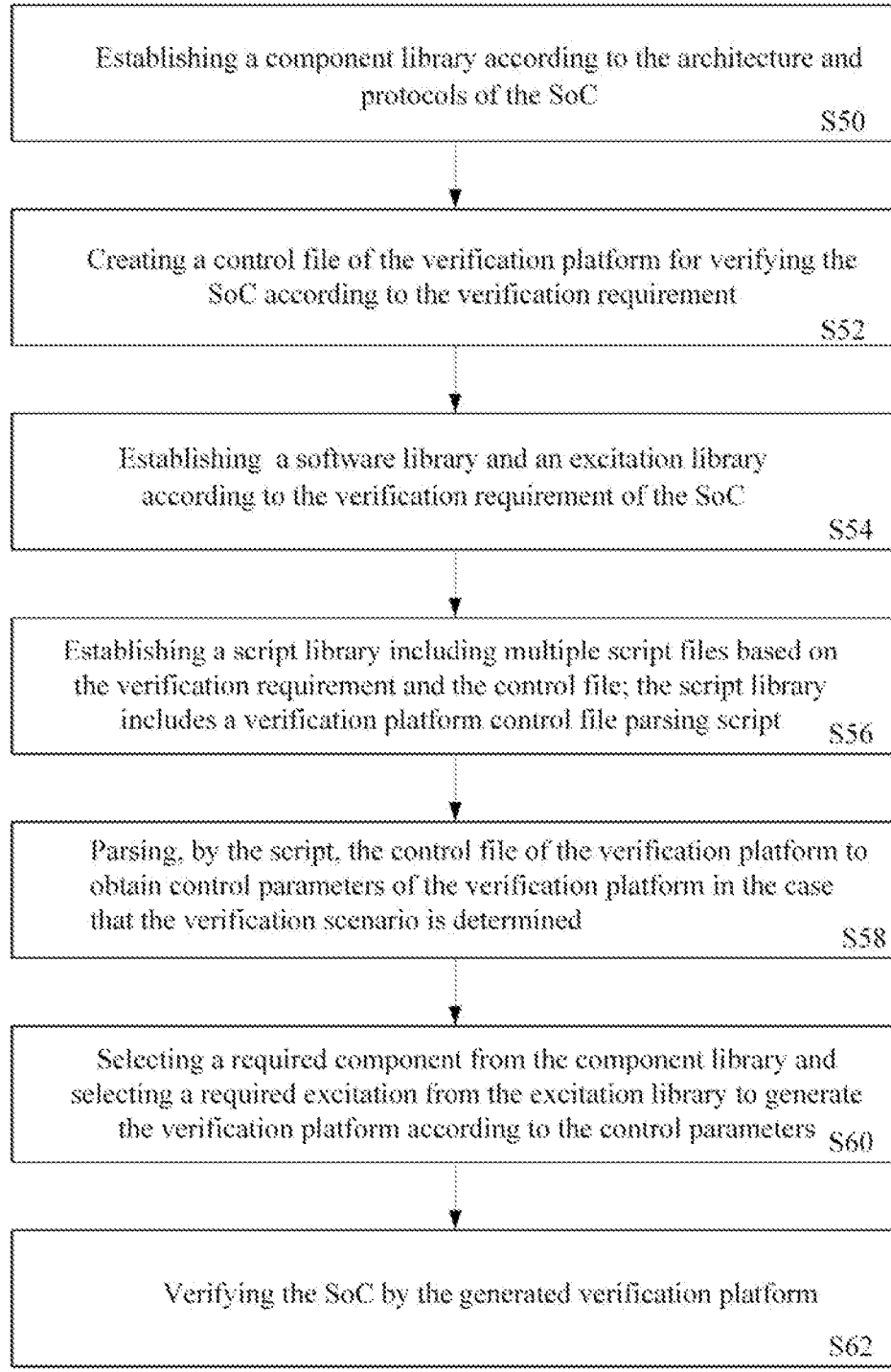
FIG. 5 is a flowchart of the method for SoC verification according to one embodiment of the present disclosure.

FIG. 5 is a flowchart of a method for SoC verification according to one embodiment of the present disclosure. According to the method, in step S50, a component library including at least interface protocol components, bus protocol components, and other verification components is established according to the architecture and protocols of the SoC. It should be understood that before performing the methods for SoC verification exemplified herein, it is necessary to understand the internal architecture of the device under test, that is, the SoC under test and the protocols involved, which include all processors, co-processors, high-speed protocol interfaces and low-speed protocol interfaces, memory interfaces and so on mounted on the interconnection bus in the SoC. In conjunction with FIG. 4, that is, it is necessary to understand the architectures of the processor 40, the multiple co-processors 42, the high-speed input interface 44, the low-speed input interface 46, the high-speed output interface 45, the low-speed output interface 47, the internal memory 48 and the external memory 49, and the communication protocol employed. For SoC, for example, according to the architecture and protocol of SoC, the corresponding interface protocol components, bus protocol components and other verification components are written. These components are usually standard high-speed, low-speed interface protocol components or standard bus interface protocols, and generally have reusable inheritance code, so the development workload is small.

In step S52, a control file of the verification platform for verifying the SoC is created according to the verification requirement, the control file includes control parameters, and the control parameters include respective bus interface parameters, flow parameters, verification environment connection relationship, simulation parameters and macro definition, etc. According to some examples of the present disclosure, the format of the verification platform control file is defined before creating the control file according to chip architecture definition and verification requirements in preparation for the generation of subsequent script and verification platform. For example, an xml (Extensible Markup Language) file format or other file format convenient for script parsing may be adopted as the format of the control file. As an example, each of the master or slave interfaces mounted on the SoC inter-interconnect bus shown in FIG. 4 is mainly considered, the verification environment parameters of each interface are defined, and other parameters and macros needed to generate the verification environment are defined. Specifically, all processors, co-processors, high-speed and low-speed protocol interfaces, and memory interfaces mounted on the interconnection bus in the SoC may be simulated as real RTL/netlist or as a bus interface model. In consideration of that fact that some processor or interfaces that are not participate in the simulation at that time will be replaced with a bus interface model (discussed below), it is also necessary to define the type and version of the bus protocol, the configuration of bus behavior and bus flow, provide the configuration of simulation tool for verification environment, the configuration of simulation tool version, the configuration of compilation option and simulation option, etc., as well as the programming language and compiler configuration formulated by each processor.

In step S54, according to the verification requirement of the SoC, a software library for each processor of the SoC to run is established, and an excitation library for corresponding components in the component library is established. The software library includes at least the execution software of each processor, and the excitation library includes at least a generator capable of issuing an excitation of each common interface protocol. Here, each processor of the Soc refers to the processor 40 and the co-processor 42 in the SoC. The programming language for establishing the software library may be, for example, assembly language and C language according to requirements, as known to those skilled in the art, after programming, it is necessary a compiler corresponding to each processor needs to compile the program into an executable file.

In step S56, a script library including multiple script files is established based on the verification requirement and the control file, and the script library includes a verification platform control file parsing script. As an example, the script library also includes a verification environment generation script, a call register model generation script, a simulation script, a regression script, a register generation script. As an example, a scripting language such as perl, python, and the like can be used for writing a script file.

In step S59, in the case that the verification scenario is determined, the script parses the control file of the verification platform to obtain control parameters of the verification platform.

In step S60, according to the control parameters, a required component is selected from the component library and a required excitation is selected from the excitation library to generate the verification platform. According to some examples of the present disclosure, the verification environment generation script obtains configuration parameters of the verification platform, selects required verification components and interface components from the component library, and generates the basic framework of the verification platform. The call register model generation script reads the register file in the platform configuration file to generate the register model code and the corresponding adaptive component. According to an example of the present disclosure, the simulation script obtains the configuration of the verification platform bused and interfaces, and generates a corresponding bus interface model configuration file according to the parameters of each interface mounted on the system bus, and according to the bus interface model configuration file, when the verification scenario simulates a specific processor or interface (such as the high speed input interface 44, the low-speed input interface 46, the high-speed output interface 45 and the low-speed output interface 47 in FIG. 4) of the multiple processors (such as each of the processors 40 and co-processors 42 in FIG. 4) of the SoC, The) are configured as respective processors or interfaces for simulation, and the remaining processors or the remaining interfaces are replaced with bus models to avoid their participation in the simulation. And further, the top layer of the verification environment is generated according to the connection relationship of the components in the configuration of the verification platform. The configuration file of the verification environment generated according to parameters of the verification platform, so as to control all configuration parameters of the verification environment. Compared with the existing verification platform, through such a configuration, when the simulation is performed, only the processor or interface to be simulated needs to be simulated, and the remaining processors or interfaces are equivalent to being temporarily masked, which saves a lot of software compilation and simulation time, while for the processor or interface being simulated, the efficiency of the compilation and simulation process is improved.

In step S62, the SoC is verified by the generated verification platform.

Figure 6:
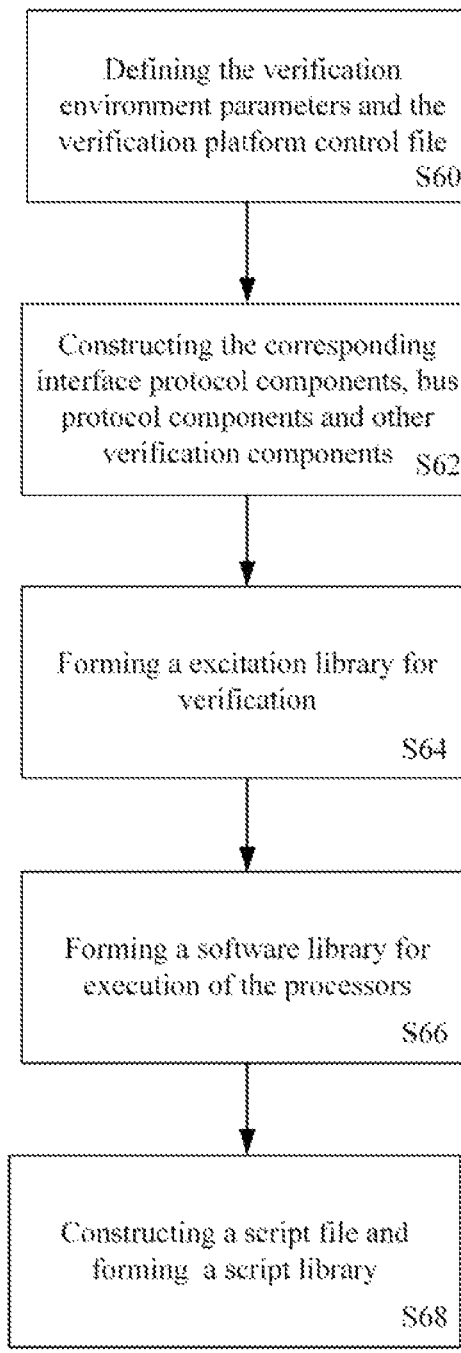
FIG. 6 is an illustration of a verification environment set-up process for SoC verification according to one specific example of the present disclosure.

FIG. 6 is an illustration of a verification environment set-up process for SoC verification according to one specific example of the present disclosure. As shown in the figure, in step S60, according to the architecture and the verification requirement of the SoC, the verification environment parameters and the verification platform control file are defined to prepare for subsequent generation of the scripts and the verification system. For example, all CPU processors, co-processors, high-speed and low-speed protocol interfaces, and memory interfaces mounted on the interconnection bus in the SoC system are simulated as real RTL or netlist or bus interface models.

In step S62, the corresponding interface protocol components, bus protocol components and other verification components are constructed according to the SoC architecture and protocol. The constructed interface protocol components, bus protocol components and other verification components are respectively formed into the interface protocol component library, the bus protocol component library and the verification system component library.

In step S64, based on the verification requirement and the protocol, a excitation for each component is constructed, and a excitation library for verification is formed.

In step S66, according to the verification requirement of the SoC, execution software for execution by each processor in the SoC is constructed and compiled into an executable file, thereby forming a software library for execution of the processors. As an example, the adopted programming language may be, for example, assembly language and C language according to the requirement.

In step S68, a script file is constructed according to the verification system control file and the verification requirement to form a script library. The verification platform control file parsing script, verification environment generation script, simulation script, regression script, register generation script, and the like can be written using script languages such as perl and python.

Through the process as described above in combination with FIG. 6, the verification environment may be built.

Figure 7:
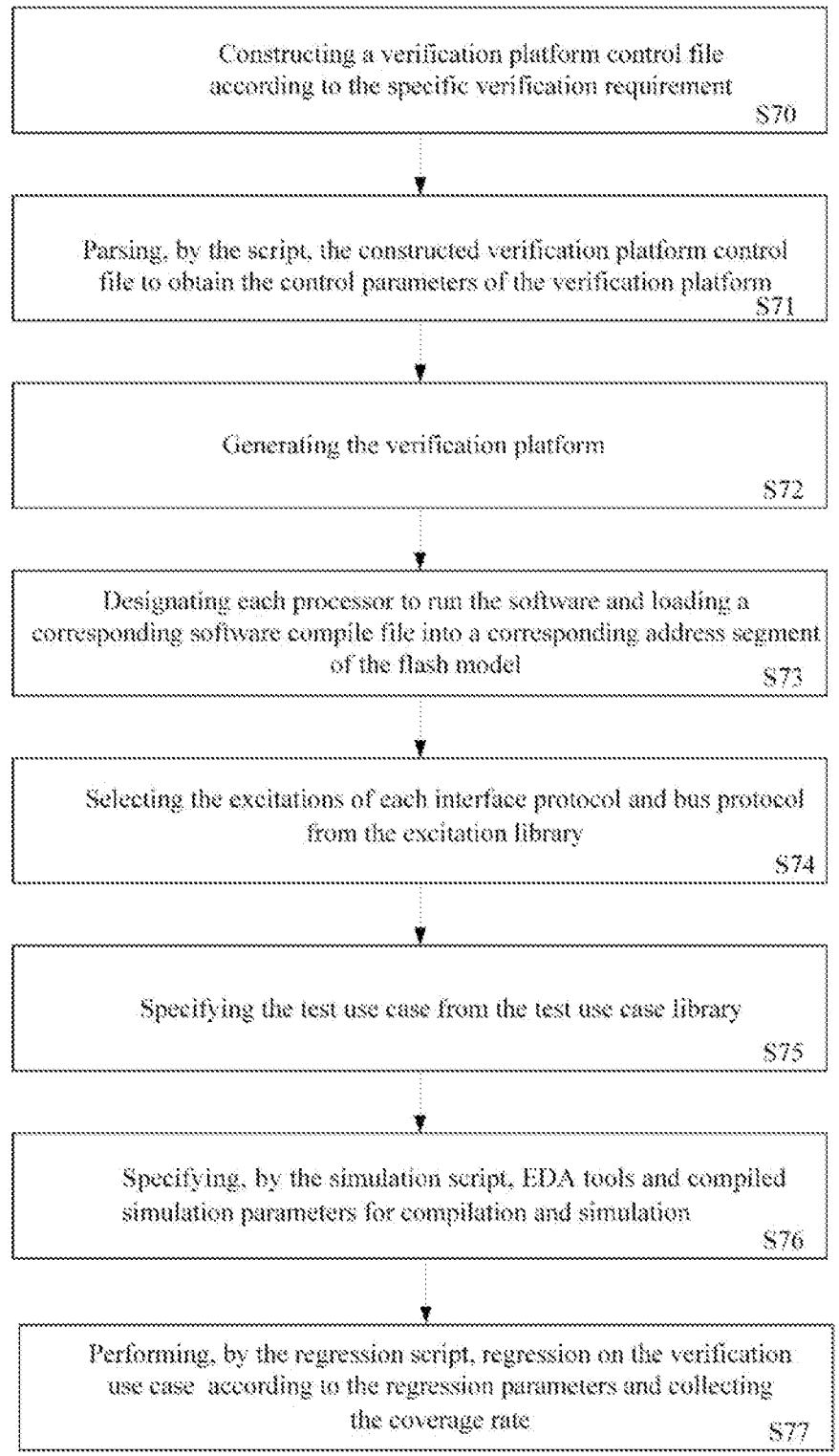
FIG. 7 is an illustration of a simulation verification flow for SoC verification according to one specific example of the present disclosure.

FIG. 7 is an illustration of a simulation verification flow for SoC verification according to one specific example of the present disclosure. In step S70, a verification platform control file is constructed according to the specific verification requirement, and the verification platform control file includes interface parameters of each bus, flow parameters, connection relationships in the verification environment, simulation parameters and macro definitions, etc. The connection relationship within the verification environment is, for example, the connection relationship between the components in the verification environment.

In step S71, the script parses the verification platform control file constructed in step S70 to obtain the control parameters of the verification platform. The script for parsing the verification platform control file constructed in step S70 is, for example, the verification platform control file parsing script obtained from the script library constructed in the example described in combination with FIG. 6.

In step S72, according to the control parameters of the verification platform obtained in step S71, various components are automatically selected from the component library and the excitation library, and the verification platform is generated according to the connection relationship. For example, the required components are selected from the component library and the excitation library constructed in the example described in combination with FIG. 6 according to the obtained control parameters of the verification platform.

The implementation process of step S72 is described in combination with a more specific example. In the method, the configuration parameters of the script read platform is generated from the verification environment, the corresponding verification components, interface components, macro definition parameters are selected from the verification component library and interface component library, and components required by the verification platform, and a basic framework are generated. The call register model generation script reads the register file in the platform configuration file, generates the register model code (UVM_RAL) and the corresponding adaptive component, that is, Adapter component. The script reads the bus interface configuration in the configuration file of the platform, and the corresponding configuration file of the bus interface model is generated according to the parameters of each interface mounted on the system bus. Thus, when the verification scenario is to simulate a specific processor or interface, other processors or interface may be configured as corresponding processors or interfaces, which greatly improves the efficiency of the compilation and simulation process. And the replacement of the CPU and other interfaces with the bus model saves a lot of software compilation and simulation time. In accordance with that connection relationship of the verification component in the platform configuration, the top layer of the verification environment is generated, and the components are connected according to the connection relationship. The configuration file env_cfg of the verification environment is generated according to the parameters in the platform configuration, and the configuration file env_cfg is used for controlling all configuration parameters of the verification environment.

In step S73, each processor is designate to run the software according to the verification requirement, and a corresponding software compile file is loaded into a corresponding address segment of the flash model. In simulation, the processor reads the instructions from the corresponding address to run.

In step S74, the excitations of each interface protocol and bus protocol are selected from the excitation library according to the verification requirement, which includes the specific excitations of each interface in accordance with the interface protocol. And a excitation corresponding to the bus behavior and the flow behavior of the bus model on the bus is selected from the excitation library.

In step S75, a test use case is specified from the test use case library according to the verification requirement.

In step S76, the simulation script specifies EDA tools and compiled simulation parameters for compilation and simulation, and these compilation and simulation processes commonly run on a single server or cluster of computing servers and the computing cloud. It should be understood that the choice of EDA tools depends on the actual application and is not limited to one, and different EDA tools may correspond to different scripts.

In step S77, the regression script performs regression on the verification use case according to the regression parameters and collects the coverage rate.

Figure 8:
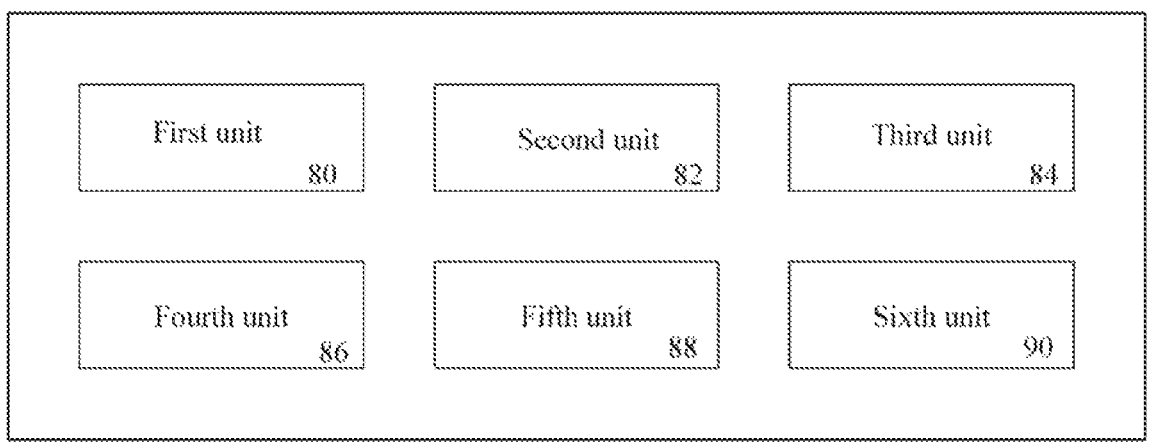
FIG. 8 is a structural diagram of a verification system according to an embodiment of the present disclosure.

The present disclosure also provides an verification system for SoC verification. FIG. 8 is a structural diagram of the verification system. As shown in the figure, the verification system includes a first unit 80, a second unit 82, a third unit 84, a fourth unit 86, a fifth unit 88 and a sixth unit 90. The first unit 80 is configured for establishing a component library including at least an interface protocol component, a bus protocol component, and an verification component according to the architecture and protocol of the SoC. The second unit 82 is create a control file for controlling a verification platform for verifying the SoC according to a verification requirement, and the control file includes control parameters. The third unit 84 is configured to establish a software library for each processor of the SoC to run according to the verification requirement of the SoC, and establish an excitation library for corresponding components in the component library. The software library includes at least an execution software of each processor, and the excitation library includes at least a generator for issuing an excitation of each universal interface protocol. The fourth unit 86 is configured to establish a script library including multiple script files based on the verification requirement and the control file, and the script library includes a verification platform control file parsing script. The fifth unit 88 is configured to parse, by the script, the control file of the verification platform to obtain control parameters of the verification platform when a verification scenario is determined. The sixth unit 90 is configured to select a required component from the component library and select a required excitation from the excitation library to generate the verification platform according to the control parameters.

In the system shown in FIG. 8, the sixth unit 90 is configured to obtain a configuration of buses and interfaces of the verification platform by the simulation script, and generate a corresponding configuration file of the bus interface model according to the parameters of each interface mounted on the system bus in the SoC. And when the verification scenario simulates a specific processor or interface of the processors of the SoC, it is configured as a corresponding processor or interface for simulation, and the remaining processors or remaining interfaces are replaced with bus models to avoid a participation of the remaining processors or the remaining interfaces in the simulation.

The verification system for SoC verification described in connection with FIG. 8 may be used to perform the verification method for SoC verification described in various examples of the present disclosure, such as the method described in connection with FIG. 5.

Figure 9:
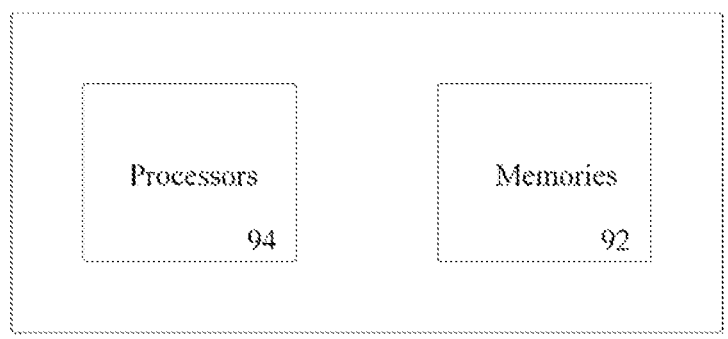
FIG. 9 is a structural diagram of a controller according to an embodiment of the present disclosure.

In accordance with that present disclosure, a controller is also provided. As shown in FIG. 9, the controller includes processors 94 and memories 92. The memories 92 store the instructions. When the instructions are executed by the processors 90, the method for SoC verification described herein is implemented.

According to the present disclosure, there is also provided an verification platform for SoC verification. The verification platform is configured as an internal architecture according to the SoC to be verified, and when a specific processor or interface of processors of the SoC is to be simulated, the specific processor or interface is configured as a corresponding processor or interface for simulation, while the remaining processors or the remaining interfaces are replaced with bus models to avoid a participation in the simulation.

The above-described embodiments represent only a few embodiments of the present disclosure, and the description thereof is more specific and detailed, but it is not to be construed as limiting the scope of the disclosure. It should be noted that, for those skilled in the art, a number of modifications and improvements can be made without departing from the concept of the present disclosure, all of which are within the scope of protection of the present disclosure. Therefore, the scope of protection of the disclosure should be subject to the attached claims.

What is claimed is:

1. A method for system-on-chip (SoC) verification, comprising:
   establishing a component library comprising at least an interface protocol component, a bus protocol component and a verification component for the SoC;
   creating a control file according to a verification requirement, wherein the control file is used for controlling a verification platform for verifying the SoC, and the control file comprises control parameters;
   establishing a software library for each processor of the SoC to run according to the verification requirement of the SoC, and establishing an excitation library for corresponding components in the component library; wherein the software library comprises at least an execution software of each processor, and the excitation library comprises at least a generator for issuing an excitation of each universal interface protocol of a plurality of universal interface protocols;
   establishing a script library comprising a plurality of script files based on the verification requirement and the control file; wherein the script library comprises a verification platform control file parsing script wherein the script library further comprises a verification environment generation script, a call register model generation script, a simulation script, a regression script and a register generation script;
   parsing, by the script, the control file of the verification platform to obtain control parameters of the verification platform when a verification scenario is determined;
   selecting a required component from the component library selecting a required excitation from the excitation library to generate the verification platform; and
   wherein the script library further comprises a verification environment generation script, a call register model generation script, a simulation script, a regression script and a register generation script, according to the control parameters; and
   verifying the SoC by the verification platform.

2. The method of claim 1, wherein the step of selecting a required component from the component library and selecting a required excitation from the excitation library to generate the verification platform according to the control parameters further comprises:
   obtaining, by the simulation script, a configuration of buses and interfaces of the verification platform, and generating a corresponding configuration file of a bus interface model according to the parameters of each interface mounted on the system bus in the SoC; and
   configuring a specific processor or interface as a corresponding processor or interface according to the configuration file of the bus interface model for simulation when the specific processor or interface of the processors of the SoC is simulated; and replacing remaining processors or remaining interfaces with bus models to avoid a participation of the remaining processors or the remaining interfaces in the simulation.

3. The method of claim 2, wherein the step of selecting a required component from the component library and selecting a required excitation from the excitation library to generate the verification platform according to the control parameters further comprises:
   obtaining, by the verification environment generation script, configuration parameters of the verification platform, selecting required verification components and interface components from the component library, and generating a basic framework of the verification platform;
   reading, by the call register model generation script, a register file in a configuration file of the platform to generate a register model code and corresponding adaptive components;
   generating a top layer of the verification environment according to a connection relationship of the components in the configuration of the verification platform; and
   generating a configuration file of the verification environment according to the parameters of the verification platform, so as to control all the configuration parameters of the verification environment.

4. The method of claim 1, wherein the method further comprises:
   defining a format of the control file of the verification platform before creating the control file of the verification platform for verifying the SoC.

5. A controller, comprising processors and memories, wherein instructions are stored in the memories, and when the instructions are executed by the processors, the method for SoC verification of claim 1 is implemented.

6. A verification system for a system on chip (SoC) verification, comprising:
   a first generation unit, configured to establish a component library comprising at least an interface protocol component, a bus protocol component, and a verification component for the SoC;
   a second generation unit, configured to create a control file for controlling a verification platform for verifying the SoC according to a verification requirement; wherein the control file comprises control parameters;
   a third generation unit, configured to establish a software library for each processor of the SoC to run according to the verification requirement of the SoC, and establish an excitation library for corresponding components in the component library; wherein the software library comprises at least an execution software of each processor, and the excitation library comprises at least a generator for issuing an excitation of each universal interface protocol of a plurality of universal interface protocols;
   a fourth unit, configured to establish a script library comprising a plurality of script files based on the verification requirement and the control file; wherein the script library comprises a verification platform control file parsing script wherein the script library further comprises a verification environment generation script, a call register model generation script, a simulation script, a regression script and a register generation script;
   a fifth unit, configured to parse, by the script, the control file of the verification platform to obtain control parameters of the verification platform when a verification scenario is determined;
   a sixth unit, configured to select a required component from the component library and select a required excitation from the excitation library to generate the verification platform according to the control parameters; and
   wherein the script library further comprises a verification environment generation script, a call register model generation script, a simulation script, a regression script and a register generation script.

7. The system of claim 6, wherein the sixth unit is further configured to:
- obtain, by the simulation script, a configuration of buses and interfaces of the verification platform, and generate a corresponding configuration file of the bus interface model according to the parameters of each interface mounted on the system bus in the SoC; and
- configure a specific processor or interface as a corresponding processor or interface according to the configuration file of the bus interface model for simulation when the specific processor or interface of the processors of SoC is simulated; and replace remaining processors or remaining interfaces with bus models to avoid a participation of the remaining processors or the remaining interfaces in the simulation.

8. A verification platform for system on chip (SoC), wherein, the verification platform is configured as an internal architecture according to the SoC to be verified, and when a specific processor or interface of processors of the SoC is to be simulated, the specific processor or interface is configured as a corresponding processor or interface for simulation, while the remaining processors or the remaining interfaces are replaced with bus models to avoid a participation in the simulation; and wherein the verification system performs the steps of
establishing a component library comprising at least an interface protocol component, a bus protocol component and a verification component for the SoC;
creating a control file according to a verification requirement, wherein the control file is used for controlling a verification platform for verifying the SoC, and the control file comprises control parameters;
establishing a software library for each processor of the SoC to run according to the verification requirement of the SoC, and establishing an excitation library for corresponding components in the component library, wherein the software library comprises at least an execution software of each processor, and the excitation library comprises at least a generator for issuing an excitation of each universal interface protocol of a plurality of universal interface protocols;
establishing a script library comprising a plurality of script files based on the verification requirement and the control file, wherein the script library comprises a verification platform control file parsing script;
parsing, by the script, the control file of the verification platform to obtain control parameters of the verification platform when a verification scenario is determined;
selecting a required component from the component library and selecting a required excitation from the excitation library to generate the verification platform according to the control parameters;
verifying the SoC by the verification platform; and
wherein the script library further comprises a verification environment generation script, a call register model generation script, a simulation script, a regression script and a register generation script.

* * * * *